United States Patent [19]

Cheney et al.

[11] Patent Number: 5,753,801
[45] Date of Patent: May 19, 1998

[54] CANISTER TESTER

[75] Inventors: Ervin J. Cheney, St. Louis Park; Bradley S. Stephens, Centerville, both of Minn.

[73] Assignee: Thiele Engineering Company, Edina, Minn.

[21] Appl. No.: 691,723

[22] Filed: Aug. 2, 1996

[51] Int. Cl.[6] ............................................. B07C 5/16
[52] U.S. Cl. ............................................................. 73/52
[58] Field of Search .................... 73/52, 865.8, 865.9, 73/168; 209/509, 522, 523; 239/71, 74

[56] References Cited

U.S. PATENT DOCUMENTS 3,091,958  6/1963  Robins ............................... 73/52
4,208,903  6/1980  Hopper et al. ..................... 73/52
5,261,538  11/1993  Evans et al. ..................... 209/523

Primary Examiner—Robert Raevis
Attorney, Agent, or Firm—Hugh D. Jaeger

[57] ABSTRACT

Canister tester for rapid testing of the contents of a pressurized canister containing fluid or gaseous matter. Incoming canisters are placed into a dual rotary canister test bed and are revolved about the canister test bed axis to mix the canister contents prior to pretest purging and final test stations. A load mechanism loads canisters into the dual rotary canister test beds for testing. An eject mechanism ejects tested canisters from the dual rotary canister test beds into an off-load star wheel. Unsatisfactorily tested canisters are ejected prior to placement on an output conveyor.

7 Claims, 12 Drawing Sheets

CANISTER TESTER

CROSS REFERENCES TO CO-PENDING APPLICATIONS

NONE.

BACKGROUND OF THE INVENTION

Field of the Invention

The present invention is for a canister testing device, and more particularly pertains to a canister testing device which provides for last minute agitation or mixing of canister contents followed by subsequent passage through one or more pretest stations and one or more final test sites where samples are drawn off for testing and quality control.

SUMMARY OF THE INVENTION

The general purpose of the present invention is a canister tester.

According to one embodiment of the present invention, there is provided a canister tester, including a framework, drive assemblies, input and output conveyors, a rotary placement star wheel which places canisters from the input conveyor in alignment with a loading mechanism, dual rotary canister test beds mounted on a geared platform, a mechanical linkage and ring support assembly for depressing of canisters in a dual rotary canister test bed for momentary contents release at pretest stations and test sites, an unload mechanism, a reject mechanism, and an output star wheel for movement of product from a test bed unloading site.

One significant aspect and feature of the present invention is a canister tester.

Another significant aspect and feature of the present invention is a geared circular platform about which a plurality of dual rotary canister test beds are aligned.

A further significant aspect and feature of the present invention is a dual rotary canister test bed which revolves about an axis to constantly agitate or otherwise mix the contents of a canister.

An additional significant aspect and feature of the present invention is a canister holder utilizing ball plungers to contain the canister during rotary motion and pretesting or testing.

Another significant aspect and feature of the present invention is the use of a mechanical linkage and positionable ring to depress canisters for the purpose of releasing canister contents for pretesting, testing and sampling.

Still another significant aspect and feature of the present invention is one or more pretest stations for purging of the canister nozzle.

Yet another significant aspect and feature of the present invention is one or more test sites.

Another significant aspect and feature of the present invention is the utilization of a central stationary gear to cause rotation in planetary style of gears on a dual rotary canister test bed which subsequently causes constant rotation of canister holders about an axis.

Another significant aspect and feature of the present invention is the use of a cam actuated linkage and load mechanism for vertical loading of canisters into a dual rotary canister test bed.

Another significant aspect and feature of the present invention is an ejection bar for ejection of tested canisters and pretested canisters from a dual rotary canister test bed.

Another significant aspect and feature of the present invention is an interface member placed between the edge of a canister and an ejection bar.

Having thus briefly described an embodiment of the present invention, it is the principal object of the present invention to provide a canister tester for testing and sampling of the contents of a canister.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
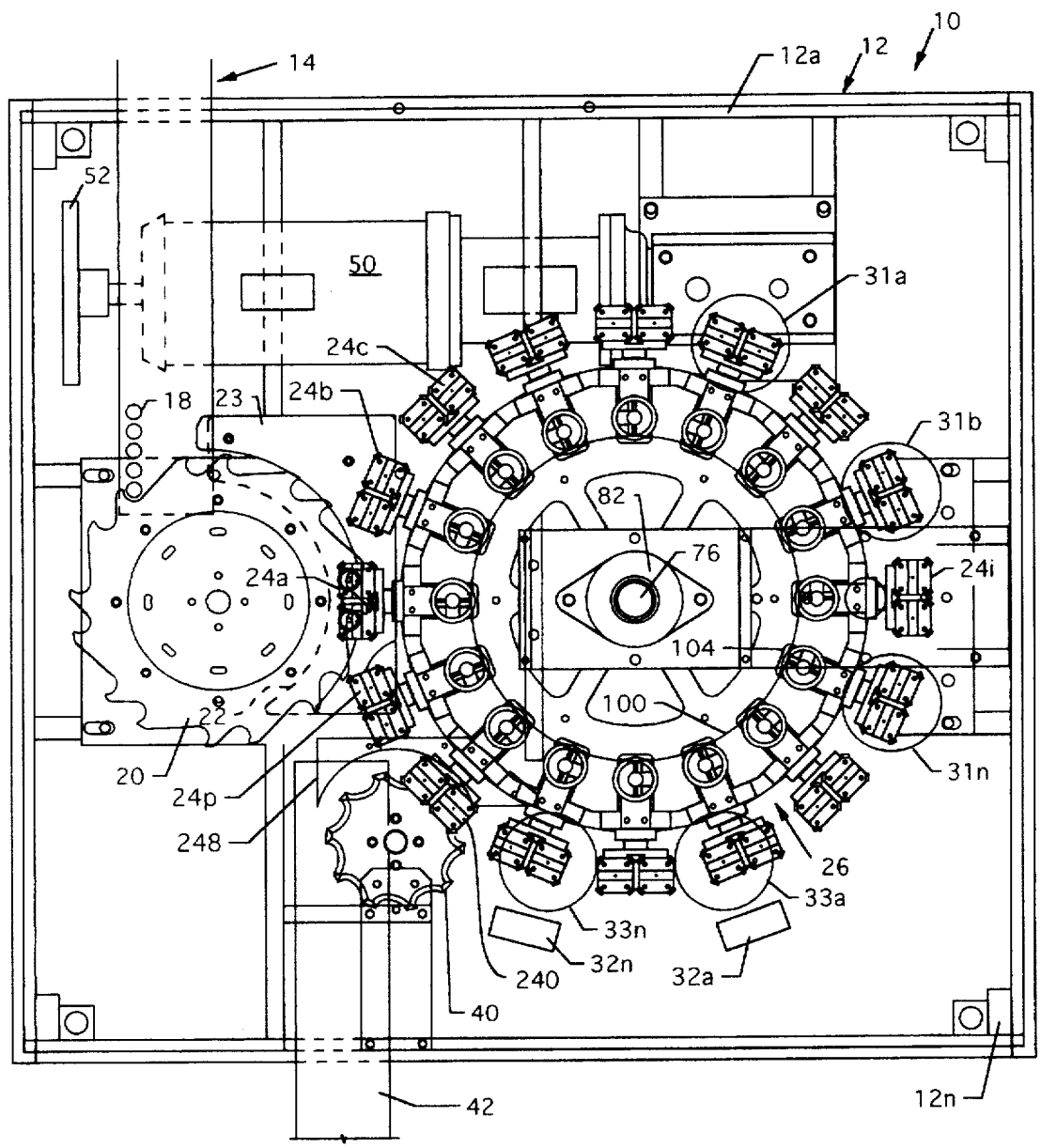
FIG. 1 illustrates a top view of the canister tester, the present invention.
Figure 2:
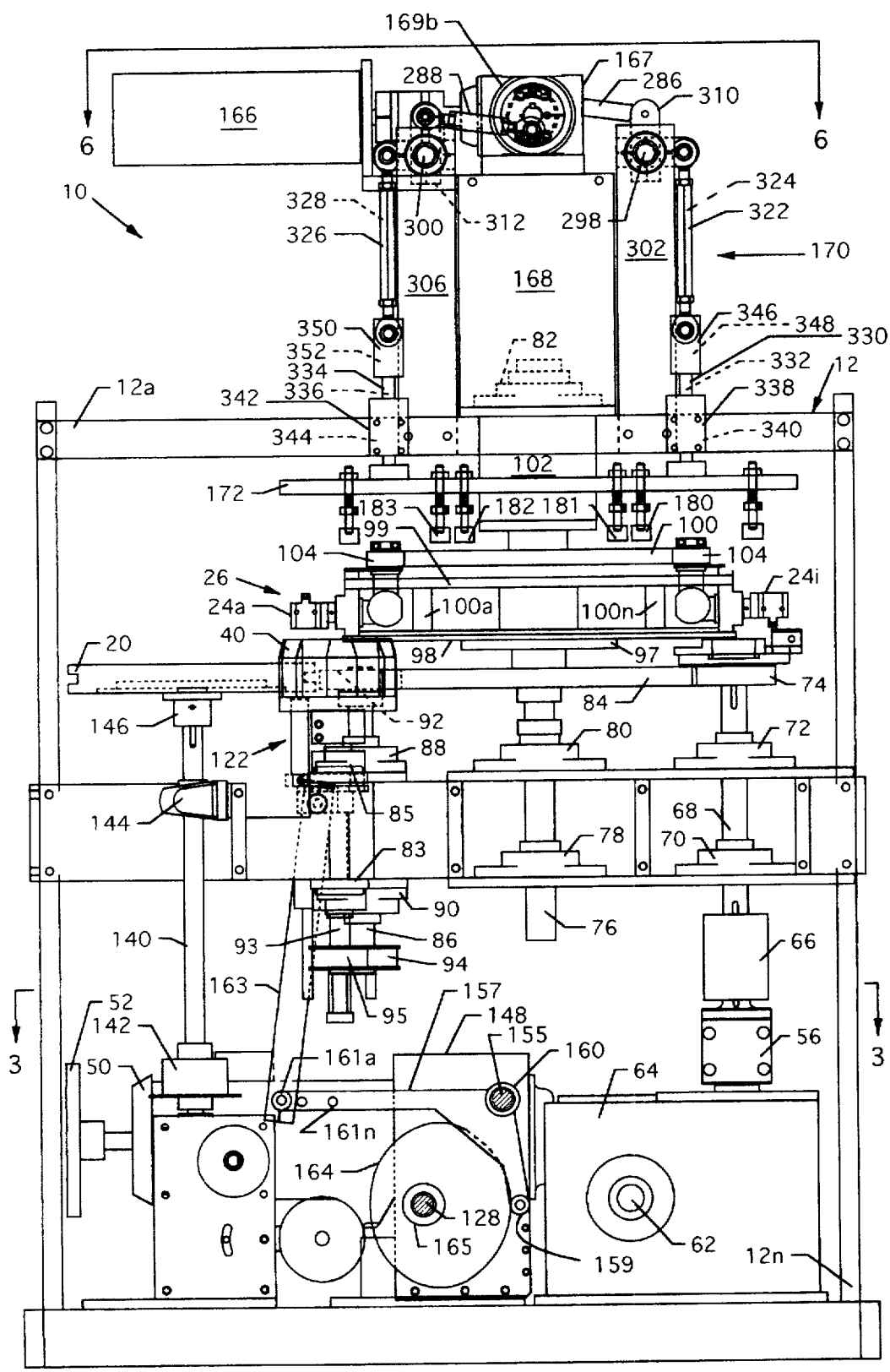
FIG. 2 illustrates a side of the canister tester.

FIG. 1 and FIG. 2 illustrate a top view and a side view, respectively, of a canister tester 10, the present invention. Components of the canister tester 10 are aligned and secured to a multilevel framework 12 having a plurality of vertical and horizontal framework members 12a–12n distributed about the framework 12 to provide support for numerous components mounted without and within. An input conveyor 14 delivers canisters 18 to a powered rotary placement star wheel 20. Canisters 18 are transferred from the input conveyor 14 by engagement with the rotary placement star wheel 20. A lower slide plate 22 and an upper guide plate 23 operate in concert with the rotary placement star wheel 20 to transfer the canisters 18 and align the canisters 18 with one of a plurality of dual rotary canister test beds 24a–24p mounted on a geared circular platform 26. Subsequent to alignment, a load mechanism 122, described later in detail, urges two of the canisters 18 into engagement with a dual rotary canister test bed 24a where the canisters are subsequently rotated about a horizontal axis of the dual rotary canister test bed 24a to provide for proper mixing of the contents of the canisters 18 prior to arrival at a plurality of pretest stations 31a–31n, designated by circles, for purging and subsequent testing at a plurality of testing devices 32a–32n at test sites 33a–33n, designated by circles, aligned to the geared circular platform 26. The dual rotary canister test beds 24a–24p are in constant rotary motion throughout the travel arc of the geared circular platform 26 and are likewise rotated between the pretest stations 31a–31n and test sites 33a–33n for complete mixing of the canister contents at all times. Canisters not meeting test requirements are ejected from the dual rotary canister test beds 24a–24p by an eject mechanism having ejection bars 244 and 246 (see FIG. 11). An output star wheel 40 powered by pulley 94 on shaft 86 urges canisters 18 which have successfully passed the rigors of the testing devices 32a–32n onto an output conveyor 42 for down line packaging.

Figure 3:
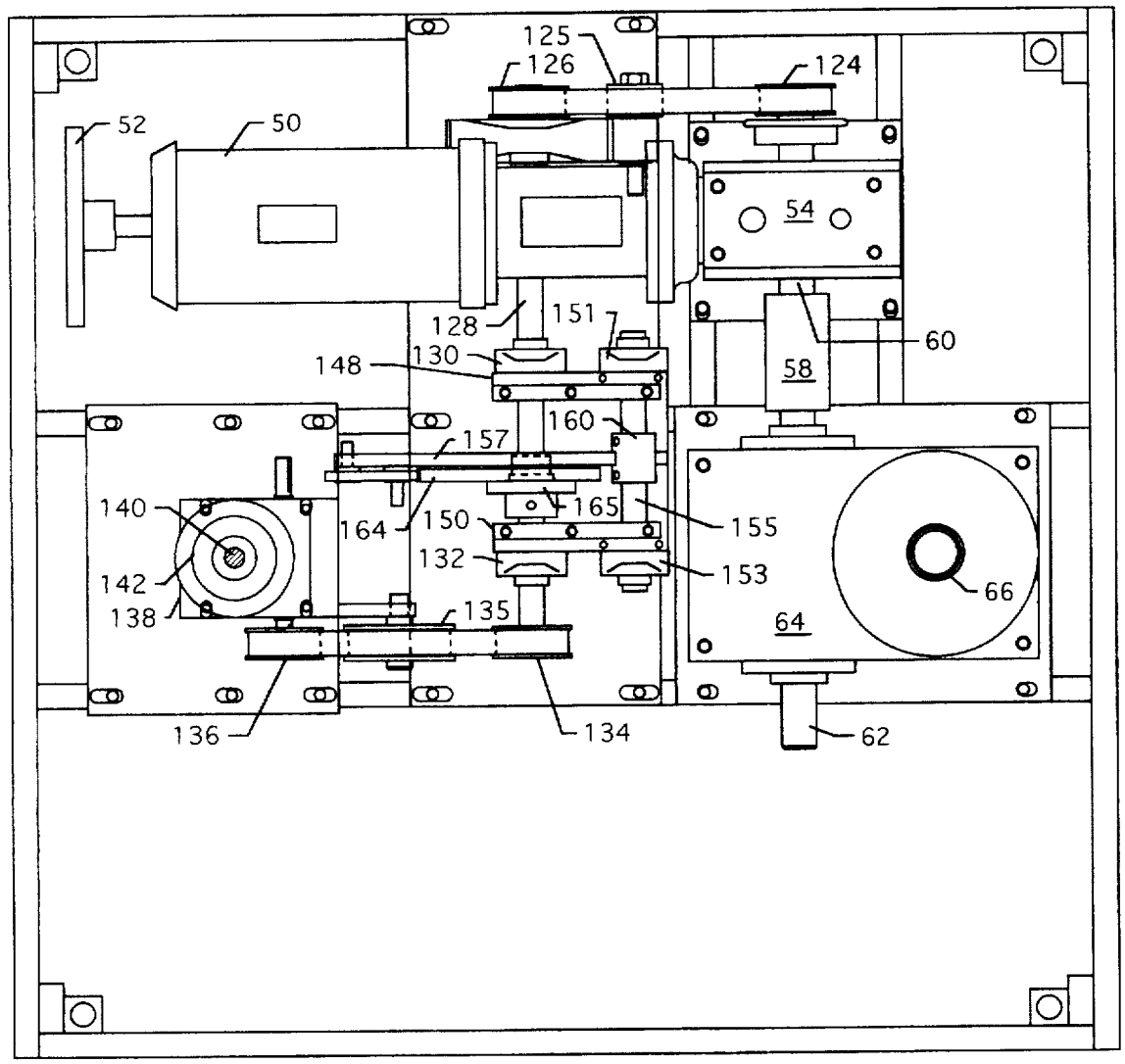
FIG. 3 illustrates a view of the lower components of the canister tester along line 3—3 of FIG. 2.

A motor 50 having a handwheel 52 secures to the framework 12 and is a major power source for powering of many components of the canister tester 10. Power from the motor 50 is delivered through an angle drive 54 and a coupler 58 connecting angle drive shaft 60 to a shaft 62 on a multiple output drive box 64, as illustrated in FIG. 3. Output is also provided from the multiple output drive box 64, coupler 56, and coupler 66 to drive a shaft 68 supported by bearing assemblies 70 and 72 secured to the framework 12. A gear 74 secures at the upper portion of the shaft 68 to provide for rotation of the geared circular platform 26, as now described in detail. A central shaft 76 is supported at its lower end by frame mounted bearing assemblies 78 and 80 and at its upper end by a frame mounted bearing assembly 82. A gear 84 aligns and secures to the central shaft 76 and aligns to the gear 74 at the upper region of shaft 68, thus providing power to the central shaft 76. Another shaft 86 is supported by frame mounted bearing assemblies 88 and 90 and includes at its upper portion a gear 92 which engages the gear 84 located on the central shaft 76. The sprocket 94 at the lower end of shaft 86 provides for chain drive of sprocket 95 at the lower end of shaft 93 and provides power for the star wheel 40 at the upper end of shaft 93 which is supported by bearing assemblies 83 and 85. The geared circular platform 26 secures to the central shaft 76 by a coupler 97 and includes a lower circular platform 98 and an upper circular platform 99 separated by a plurality of spacers 100a–100n. The plurality of dual rotary canister test beds 24a–24p secure between the upper and lower circular platforms 99 and 98. A stationary gear 100 is suspended from the framework 12 by a support 102 in alignment and in engagement with a plurality of like gears 104 which are integral to and members of the dual rotary canister test beds 24a–24p. As the geared circular platform 26 is rotated about the stationary gear 100, canisters 18 held in the dual rotary canister test beds 24a–24p are rotated about a horizontal axis for canister nozzle purging and canister testing, as described later in detail.

FIG. 3 illustrates a view of the lower components of the canister tester 10 along line 3—3 of FIG. 2, where all numerals correspond to those elements previously described. Power from shaft 62 is ultimately utilized to operate the load mechanism 122, illustrated in FIG. 2, and to rotate the rotary placement star wheel 20.

One end of shaft 62 supports a sprocket 124 which drives sprocket 126 on shaft 128 in conjunction with an idler sprocket 125. Bearing assemblies 130 and 132 support shaft 128. Another sprocket 134, in conjunction with an idler sprocket 135, provides for chain driven power to a sprocket 136 secured to an angle drive gear box 138. A vertical shaft 140, also illustrated in FIG. 2, is supported and powered at its lower end by the angle drive gear box coupler 142 and at its upper end by bearing assembly 144. The rotary placement star wheel 20 secures to the upper end of the shaft 140 by a connector flange 146.

With reference to FIGS. 2 and 3, the actuation of the load mechanism 122 is now described, where all numerals correspond to those elements previously described. The load mechanism 122 is operated by a cam and linkage which is actuated by rotation of shaft 128. Vertical mounting plates 148 and 150 serve as mounts for bearing assemblies 130 and 132, respectively, as well as bearing assemblies 151 and 153; however, mounting plate 150 is not shown in FIG. 2 for purposes of brevity and clarity. A pivot shaft 155 is supported by bearing assemblies 151 and 153. A configured pivot arm 157, having a cam follower 159, includes a cylindrical mounting flange 160 which secures over and about pivot shaft 155. One end of the pivot arm 157 includes a plurality of adjustment holes 161a–161n for stroke adjustment to accommodate different size canisters 18. An actuator arm 163 is pinned through one of the holes 161a–161n to provide different length strokes of the load mechanism 122. Eccentric cam 164 secures to the shaft 128 by a collar mount 165 and is operated by the shaft 128. The cam follower 159 actuates the pivot arm 157 about the pivot shaft 155 to vertically actuate the actuator arm 163 to operate the load mechanism 122 to load a canister held by the rotary placement star wheel 20 and its associated members into the dual rotary canister test beds 24a–24p. Load mechanism 122 is further illustrated in FIGS. 4 and 5.

Figure 4:
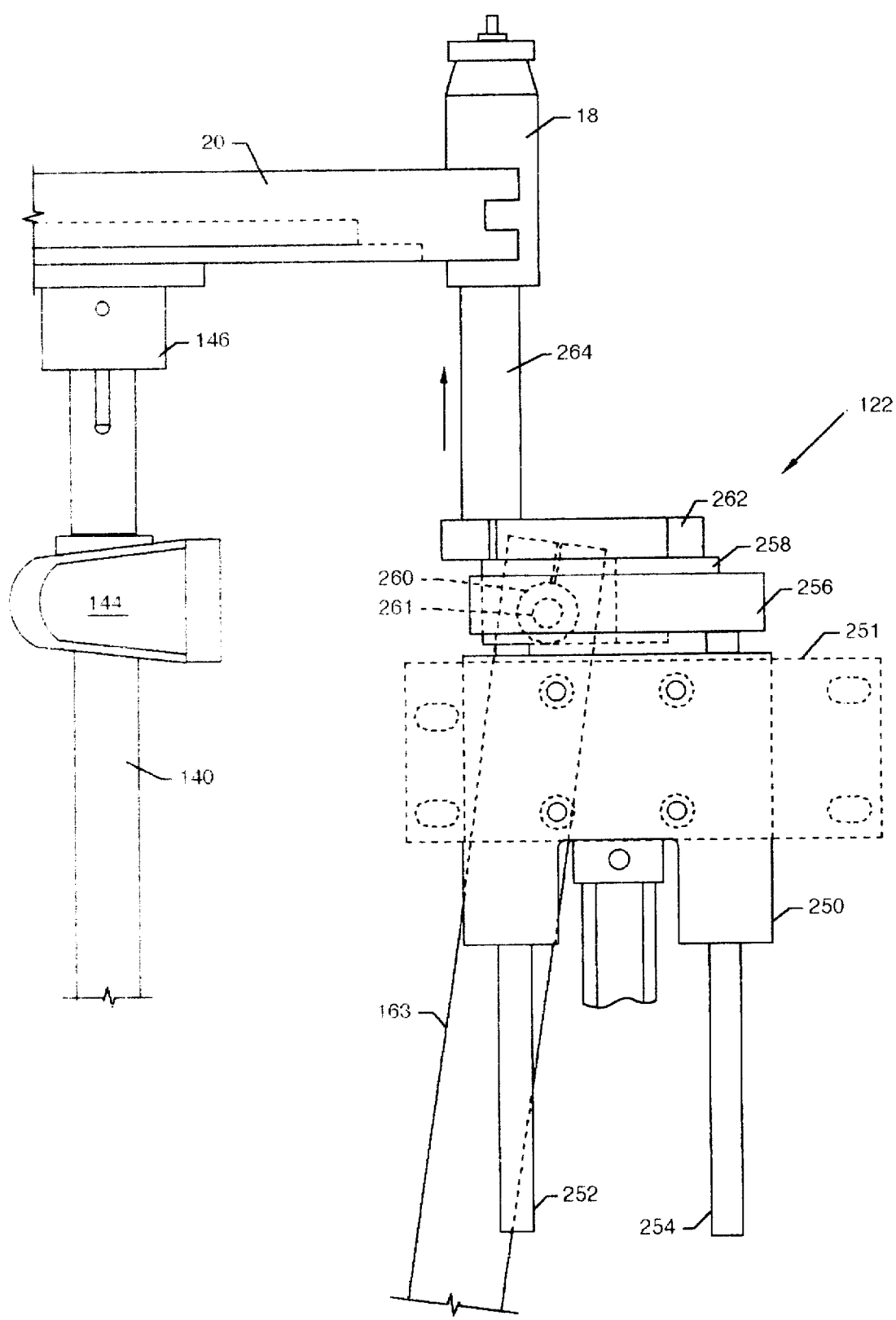
FIG. 4 illustrates a side view of the load mechanism.

FIG. 4 illustrates a side view of the load mechanism 122, where all numerals correspond to those elements previously described. With reference to FIG. 2, load mechanism 122 is located behind and generally below the level of the output star wheel 40 and is located beneath a portion of the circumference of the rotary placement star wheel 20 so that canisters 18 may be positioned upwardly from the confines of the rotary placement star wheel 20 into the overlying members of the dual rotary canister test beds 24a–24p.

Figure 5:
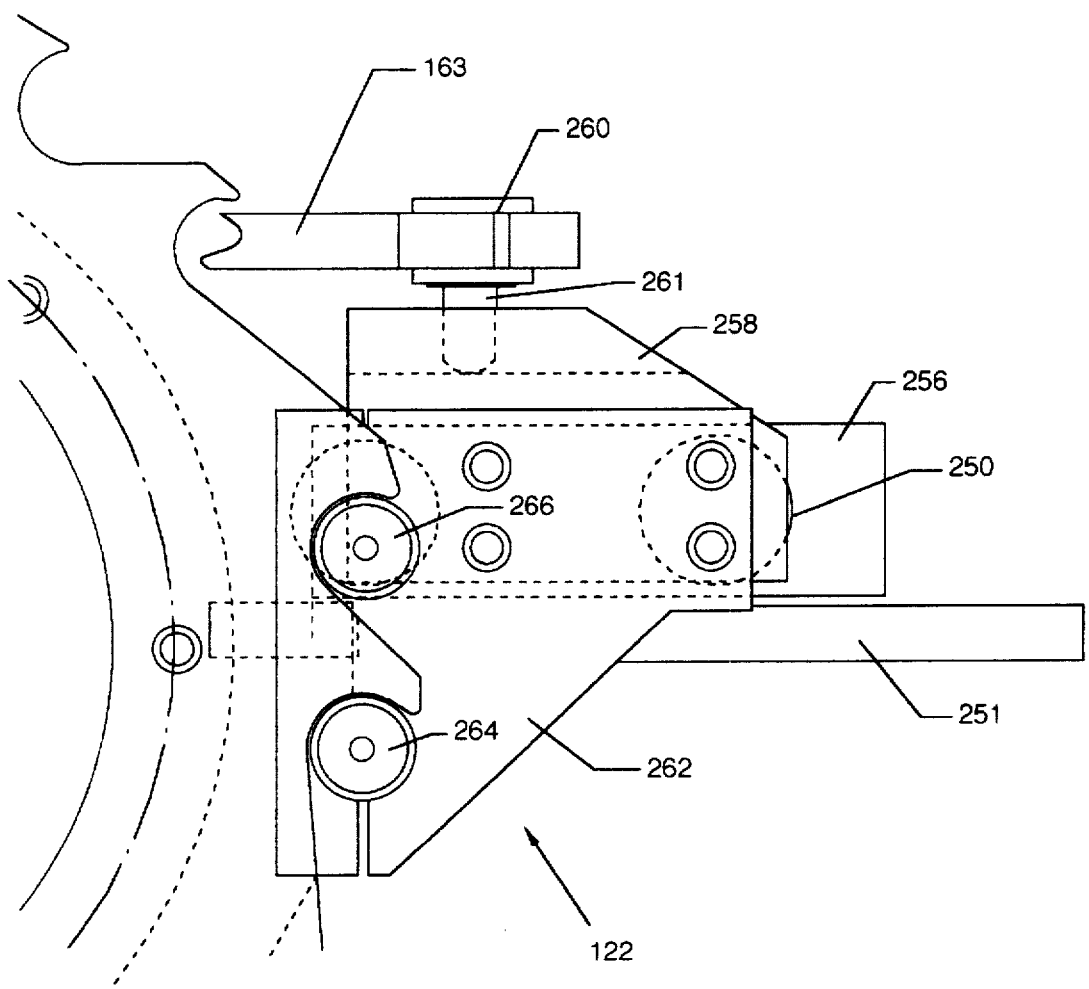
FIG. 5 illustrates a top view of the load mechanism.

FIG. 5 illustrates a top view of the load mechanism 122, where all numerals correspond to those elements previously described.

With reference to FIGS. 4 and 5, the load mechanism 122 is now described. A dual bearing block 250 secures to a framework mounting plate 251 and includes parallel positioning rods 252 and 254, each secured to a common block member 256. An angle member 258 suitably secures to the upper region of the block member 256. A follower cam 260 at the upper end of the actuator arm 163 secures in the vertical portion of the angle member 258 via a pivot 261. A mounting plate 262 suitably secures to the horizontal region of the angle member 258 and serves as a mount for vertically oriented pusher rods 264 and 266. Vertical reciprocating motion of the actuator arm 163 as provided by eccentric cam 164 on pivot arm 157 causes the block member 256, angle member 258, mounting plate 262, pusher rods 264 and 266, and positioning rods 252 and 254 to be vertically actuated to load canisters 18 into the dual rotary canister test beds 24a–24p.

Figure 6:
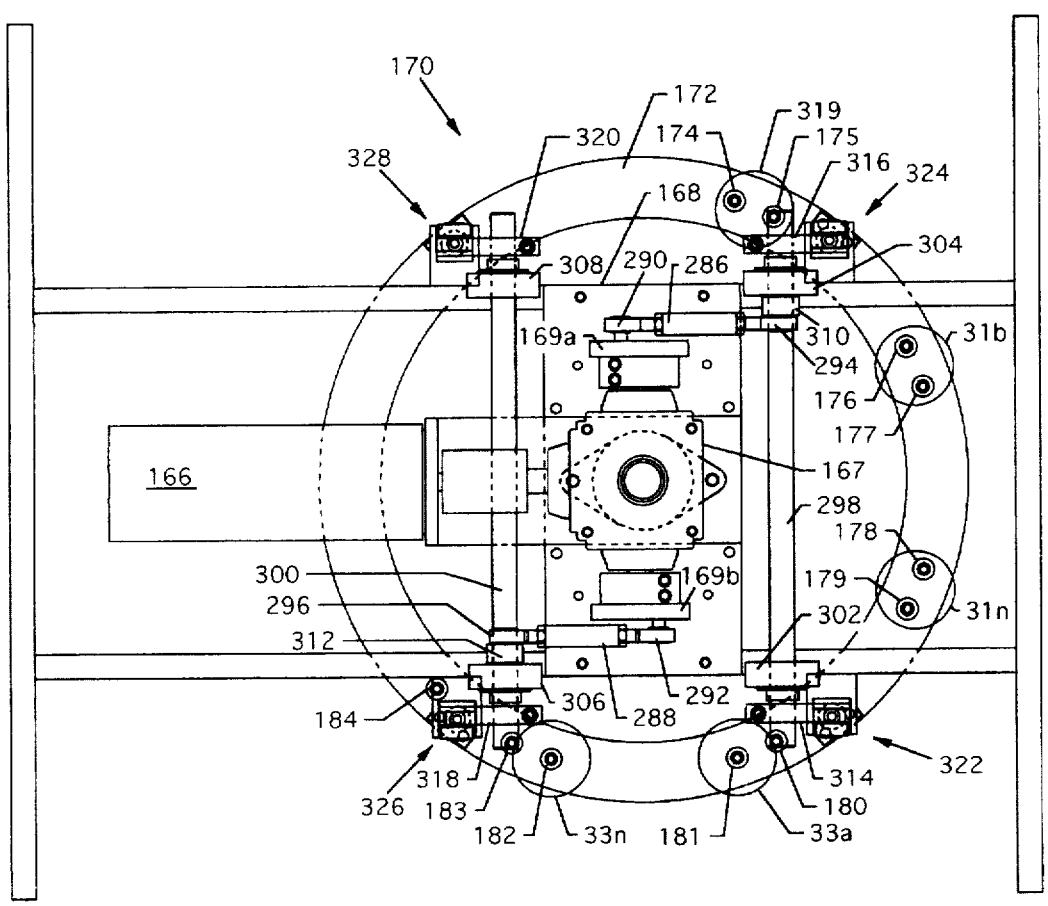
FIG. 6 illustrates a top view of the mechanical linkage and ring support assembly along line 6—6 of FIG. 2.

FIG. 6 illustrates a top view of a mechanical linkage and ring support assembly 170 also referred to in FIG. 2 along line 6—6 of FIG. 2, where all numerals correspond to those elements previously described. With reference to FIG. 2 and FIG. 6 a support ring 172 aligns over and above the geared circular platform 26 containing a plurality of dual rotary canister test beds 24a–24p. Pluralities of spring loaded plungers 174, 175, 176, 177, 178 and 179 at pretest stations 31a–31n and spring loaded plungers 180, 181, 182, 183 and 184 at test sites 33a–33n, each having similar construction, are aligned through the support ring 172 and align over one or more canisters 18 contained in the dual rotary canister test beds 24a–24p at different points in time. The spring loaded plungers 174–179 and 180–184, by downward action of the support ring 172, sequentially depress the canisters 18 in the dual rotary canister test beds 24a–24p to cause actuation of the internal nozzle valve of each canister 18. Pretest station spring loaded plungers 174–179 ensure that the nozzle of each canister 18 is purged and cleared of air and that the liquid contents of the canister 18 is present at the distal end of the nozzle valve so that a full sample of the liquid contents may be subsequently injected into the testing devices 32a–32n illustrated in FIG. 1.

Actuation of a mechanical linkage and ring support assembly 170 causes the support ring 172 to be downwardly actuated to cause the spring loaded plungers 174–184 to appropriately engage the canisters at the pretest stations 31a–31n and at the test sites 33a–33n. An actuator motor 166 and a dual output gear box 167 secure to a stand 168 located at the upper region of the framework members 12a–12n. Opposing gear box outputs 169a and 169b couple in an eccentric fashion to link rods 286 and 288 via suitable rod end connectors 290 and 292. The opposing rod end connectors 294 and 296 secure to opposing pivot rods 298 and 300 via vertically oriented crank arms 310 and 312, respectively.

Pivot rod 298 is supported by bearings in vertical posts 302 and 304, and pivot rod 300 is supported by bearings in vertical posts 306 and 308. Horizontally oriented crank arms 314, 316, 318 and 320 secure to the ends of the pivot rods 298 and 300, as illustrated, and each of the horizontally oriented crank arms 314, 316, 318 and 320 secures to a link rod 322, 324, 326 and 328, as illustrated. Link rods 322, 324, 326 and 328 secure by couplers 346, 348, 350 and 352 to the ends of posts 330, 332, 334 and 336 which, in turn, align through guides 338, 340, 342 and 344 on framework 12 to secure to the upper surface of the support ring 172. Thus, actuation of the support ring 172 is effected to respectively cause the spring loaded plungers 174–184 to depress canisters held in the dual rotary canister test beds 24a–24p.

Figure 7:
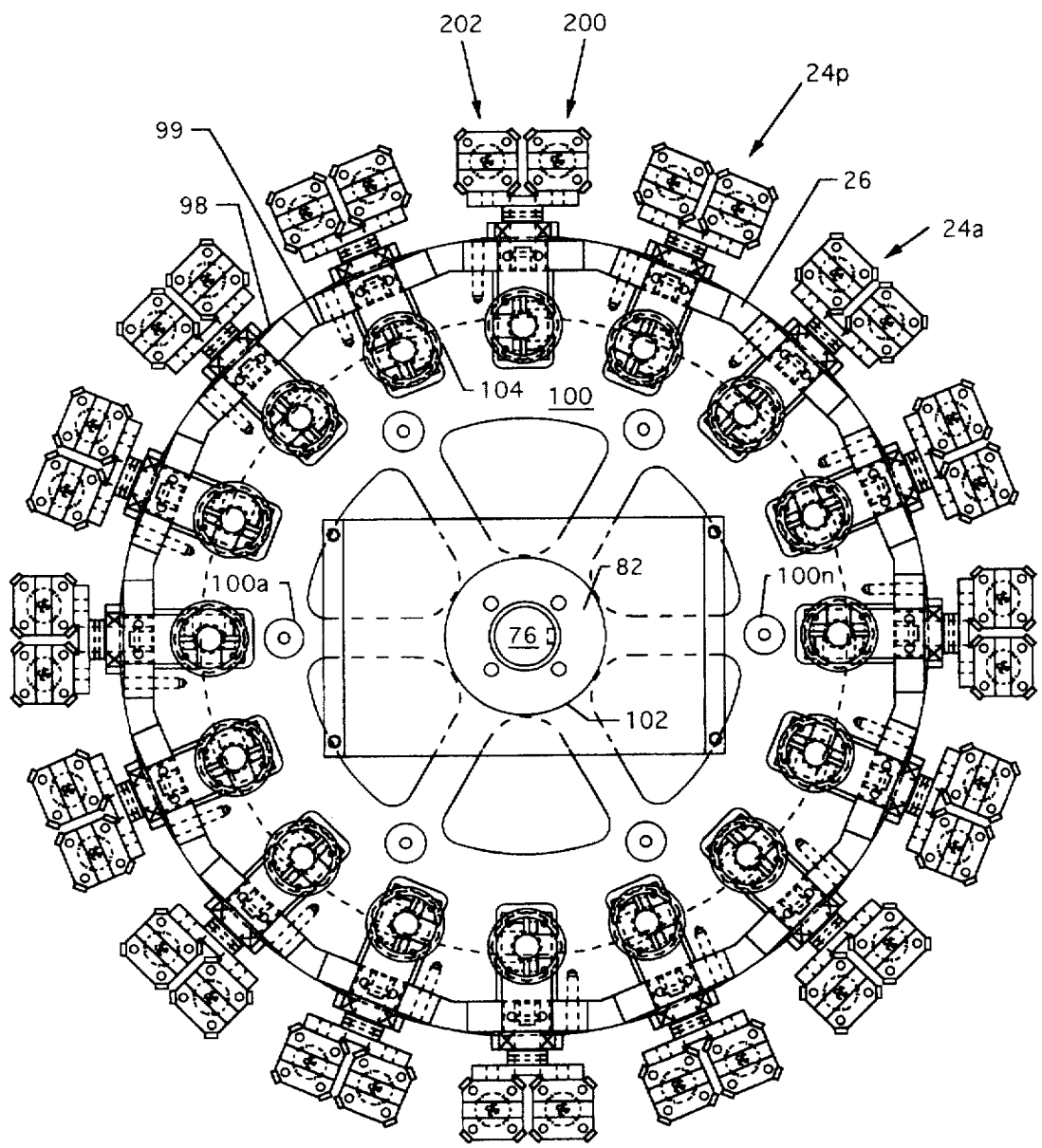
FIG. 7 illustrates a top view of the geared circular platform.

FIG. 7 illustrates a top view of the geared circular platform 26, where all numerals correspond to those elements previously described. Illustrated in particular is the stationary gear 100 engaging gears 104 of each dual rotary canister test bed 24a–24p. As the geared circular platform 26 and the dual rotary canister test beds 24a–24p travel about the stationary gear 100, the canister holders 200 and 202 of each dual rotary canister test bed 24a–24p are rotated about their axis to mix the contents of the canisters for pretesting at pretest stations 31a–31n and for testing at test sites 33a–33n, as illustrated in FIG. 1.

MODE OF OPERATION

Figure 8:
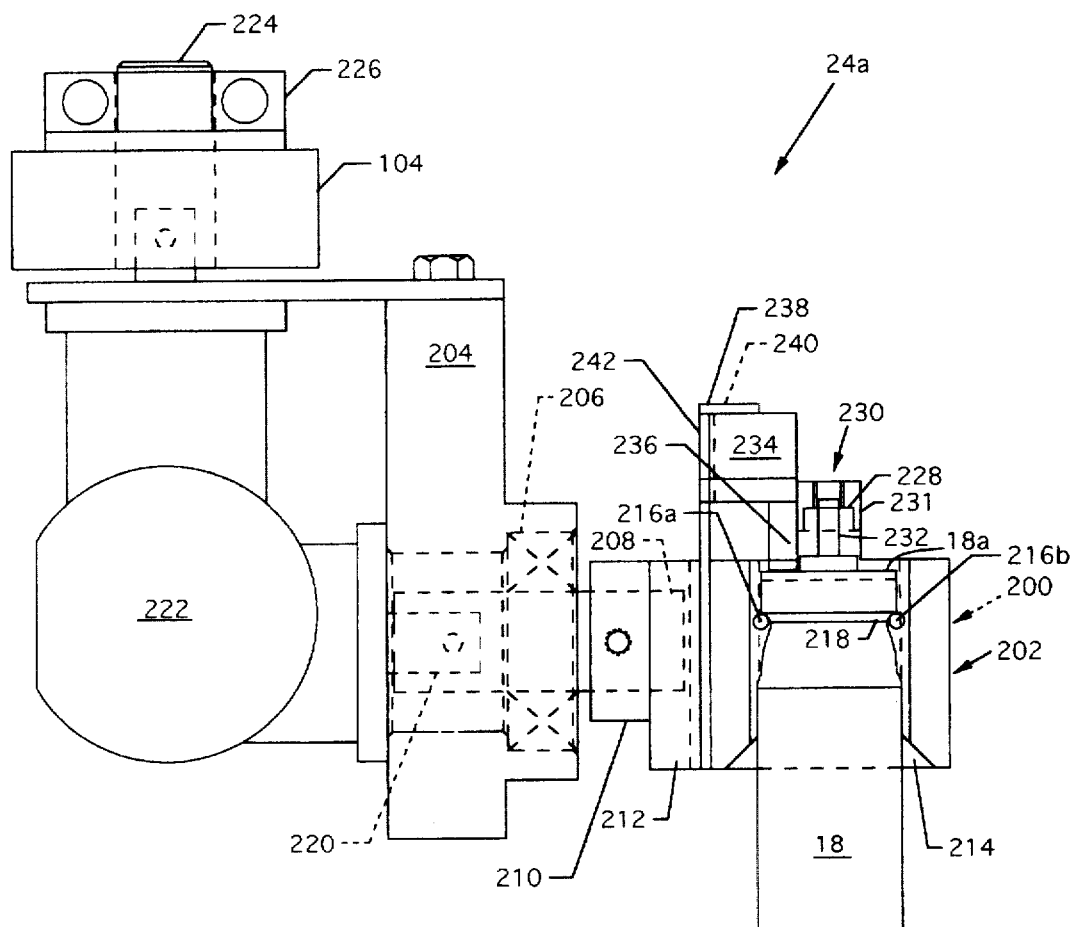
FIG. 8 illustrates a side view of a dual rotary canister test bed.
Figure 9:
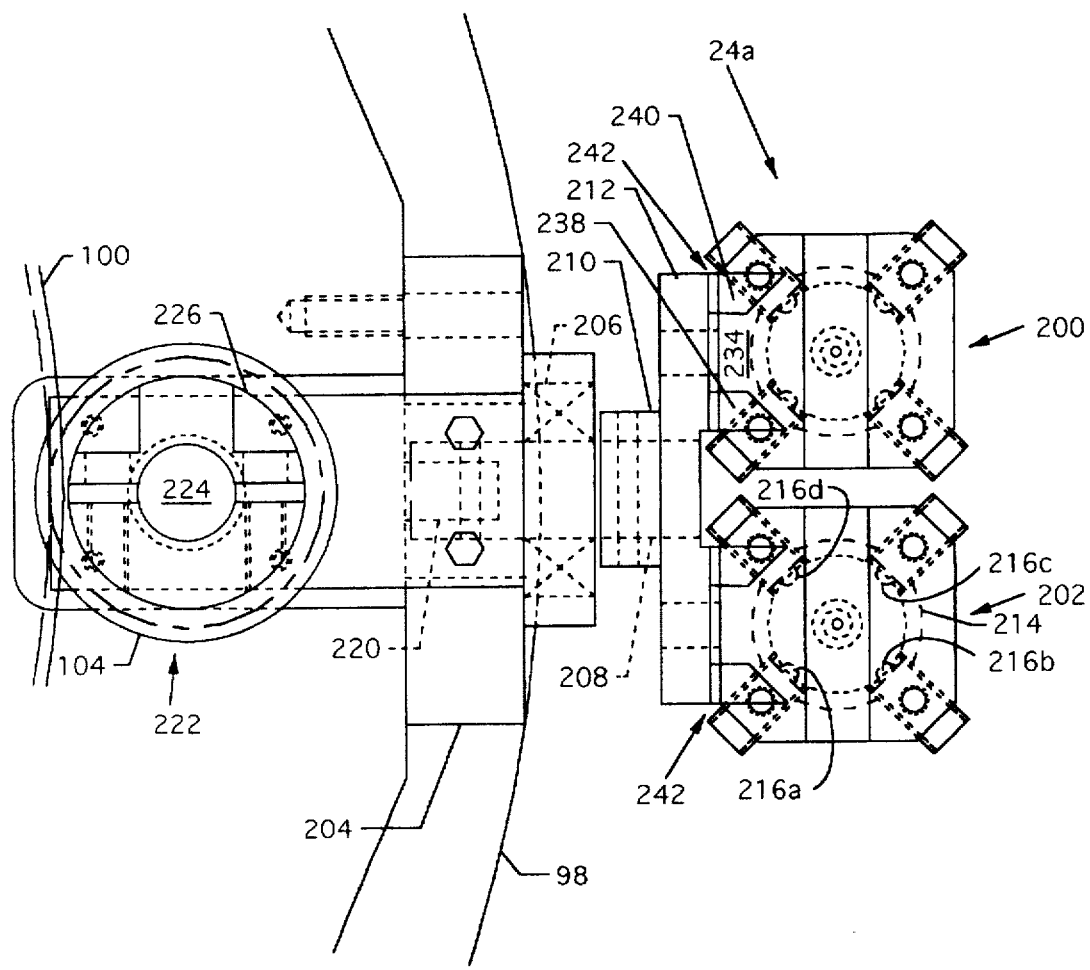
FIG. 9 illustrates a top view of a dual rotary canister test bed.

FIGS. 8 and 9 illustrate a side view and a top view, respectively, of a dual rotary canister test bed 24a, where all numerals correspond to those elements previously described. The dual rotary canister test bed 24a includes a rectangular-like housing 204 which secures between the lower and upper circular platforms 98 and 99 of FIG. 2. A bearing 206 aligns in the housing 204 to support a horizontal shaft 208. A collar 210 and mounting plate 212 secure by a suitable fastener to one end of the horizontal shaft 208. Canister holders 200 and 202 secure to the mounting plate 212. The canister holders 200 and 202, being of similar construction, each includes an open ended chamber 214 for accommodation of canisters 18. A plurality of ball plungers 216a–216d align in the walls of the chamber 214 to accommodate and capture the annular groove 218 at one end of the canister 18. The ball plungers 216a–216d secure the canisters 18 within the chamber 214 as the canister holders 200 and 202 are revolved about their common axis at shaft 208 during revolving movement of the geared circular platform 26. The other end of the horizontal shaft 208 aligns and secures to shaft 220 of a beveled gear box 222 which secures to the housing 204. A vertical shaft 224 extends from the beveled gear box 222 to accommodate gear 104 which secures thereto by a collar 226. Rotation of the gear 104 causes the canister holders 200 and 202 to rotate about the axis of the shaft 208 to mix the liquid contents and to vertically position the canisters with the nozzles pointing downward at the pretest stations 31a–31n and test sites 33a–33n, respectively, as illustrated in FIG. 1. A pin 228 aligns across a large orifice 230 at the stem 231 of the chamber 214 which subsequently contacts the nozzle 232 during pretesting or testing actuation to cause dispersal of fluid from the canister 18 through the nozzle 232. Stem 231 appropriately aligns to pretest stations 31a–31n and test sites 33a–33n.

Loading of the canisters 18 is accomplished by action of the load mechanism 122 illustrated in FIGS. 2, 5 and 6. During loading the canisters are urged vertically into the chambers 214 by the load mechanism 122 at which time an interface member 234, which is basically a rectangular solid and having a tab 236 extending vertically therefrom, is positioned upwardly. The upper annular rim 18a of the canister 18 enters into intimate contact with the tab 236 and pushes the interface member 234 into very close proximity with opposing keeper bars 238 and 240 on retention assemblies 242 attached to the canister holders 200 and 202. A member of the ejection mechanism is actuated to strike the interface member 234 in the area between the keeper bars 238 and 240 to overcome the holding power of the ball plungers 216a–216d and force the successfully tested canister 18 downwardly into the pockets of the output star wheel 40 for off-loading via the output conveyor 42, as later described in detail. The interface member 234 provides protection for the upper surface of the canister 18 during unloading.

Figure 10:
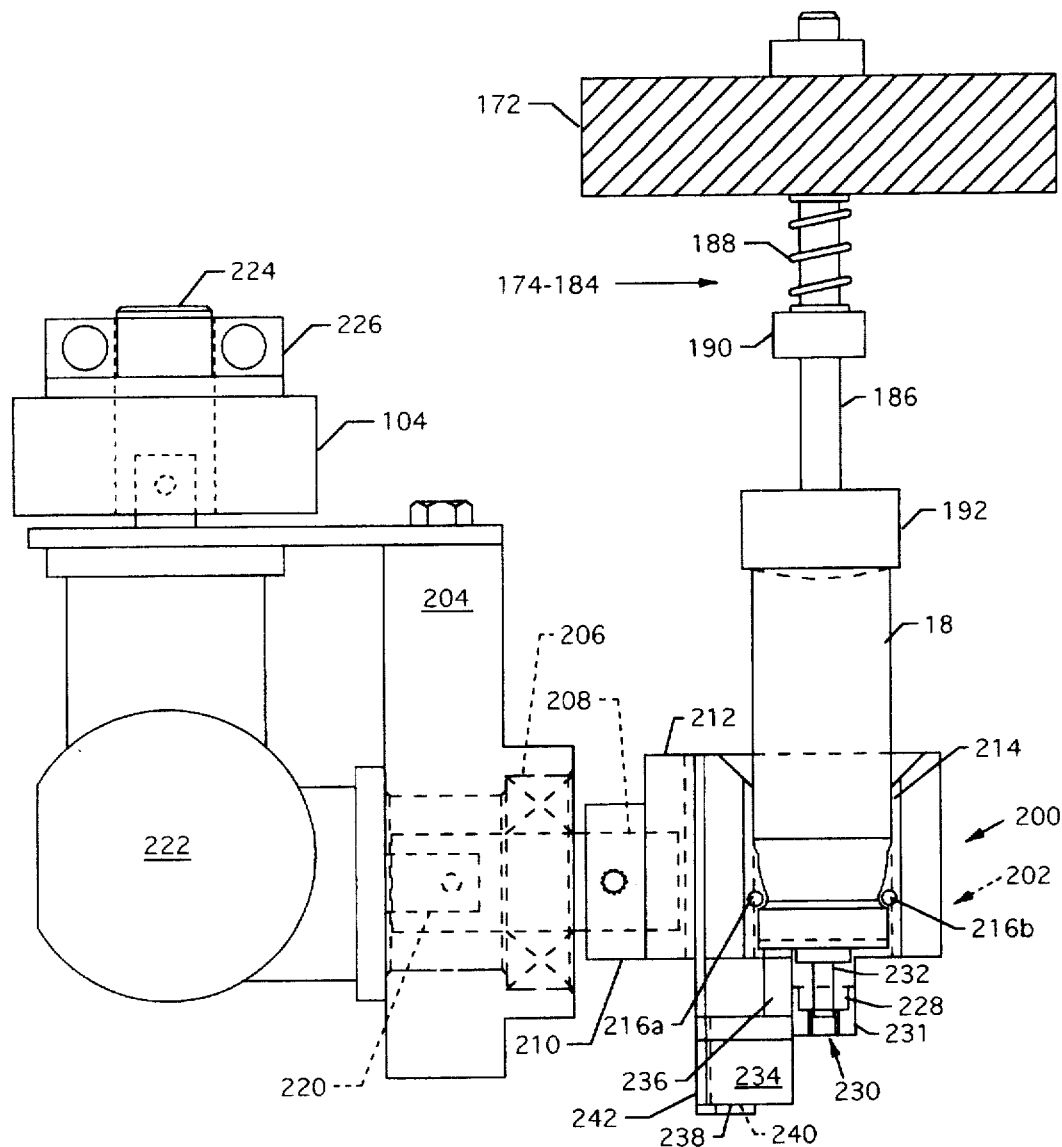
FIG. 10 illustrates a canister aligned and depressed into a canister holder for pretesting or testing.

FIG. 10 illustrates a canister 18 aligned in a canister holder 200, where all numerals correspond to those elements previously described. The support ring 172 having plungers, such as plungers 174–184, is illustrated in intimate pressured contact with the bottom of a canister 18, thus depressing the nozzle 232 of the canister 18 against pin 228 to discharge liquid (or gaseous) contents of the canister 18 for testing or pretesting, such as at pretesting stations 31a–31n or testing sites 33a–33n. The plungers 174–184 are mounted to the support ring 172 and each includes a moveable shaft 186 slideably extending through the support ring 172, a spring 188, a collar 190 affixed over and about the shaft 186, and a contact member 192, which intimately contacts the bottom of the canister 18. The spring 188 is appropriately tensioned to appropriately depress the nozzle 232 against pin 228 for contents sampling.

Figure 11:
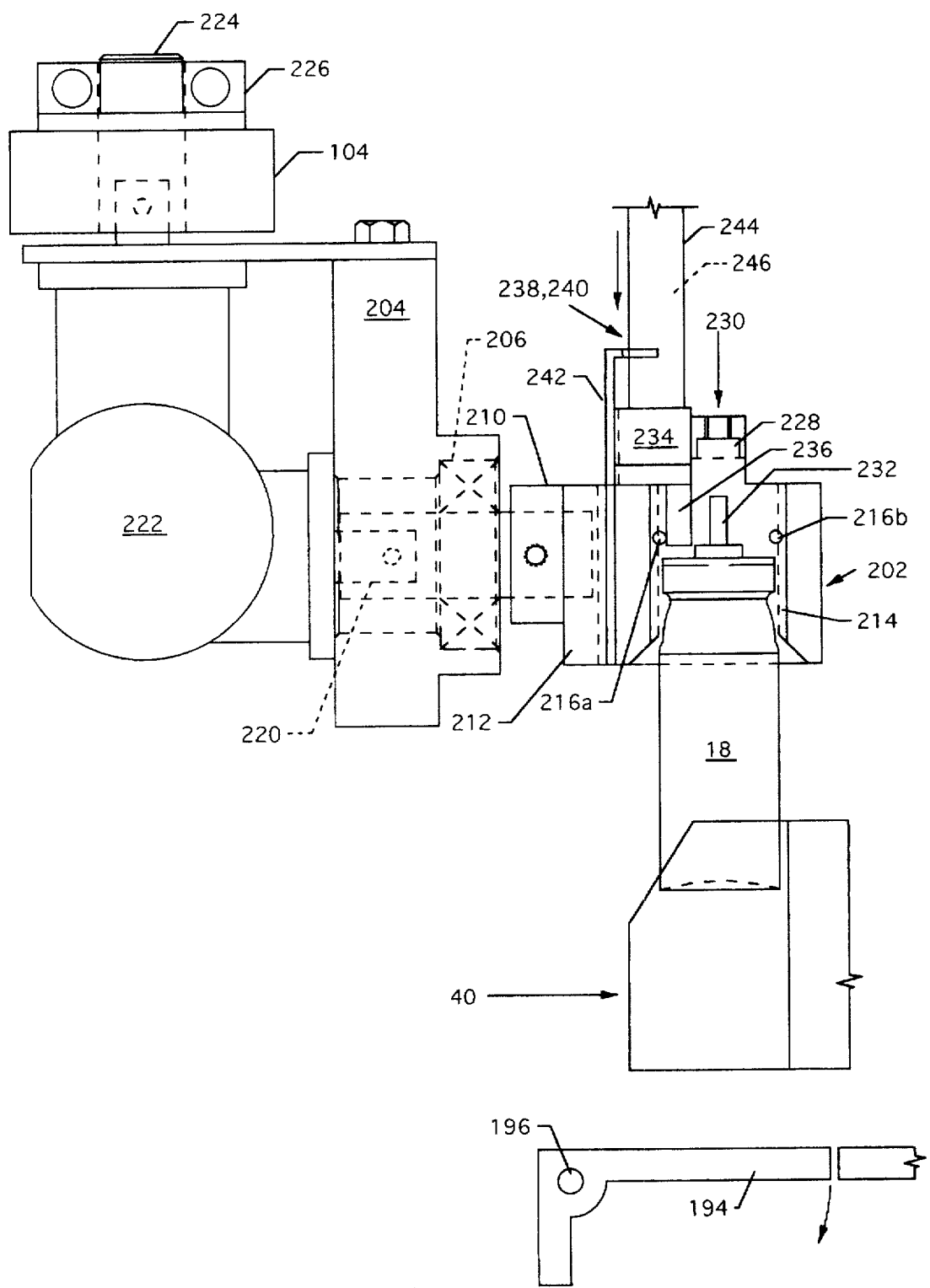
FIG. 11 illustrates a canister being ejected from the canister holder.

FIG. 11 illustrates a canister 18 which has been tested being ejected from the canister holder 202 by an ejection bar 244 which is a member of an eject mechanism (not illustrated), where all numerals correspond to those elements previously described. The ejection bar 244 (and corresponding non-illustrated similar and adjacent bar 246) aligns and enters the chamber 214 to come in direct striking contact with the interface member 234 having tab 236 to contact the canister 18 to cause the canister 18 to be forcibly ejected downwardly into the output star wheel 40 and thus delivered to the output conveyor 42. Canisters 18, which have been tested and are unsuitable, are referenced by suitable methods and are disposed of by actuation of an escape platform 194 suitably rotated about a pivot 196. Those canisters having been successfully tested are urged by the output star wheel 40 along the escape platform 194 and to the output conveyor 42.

Figure 12:
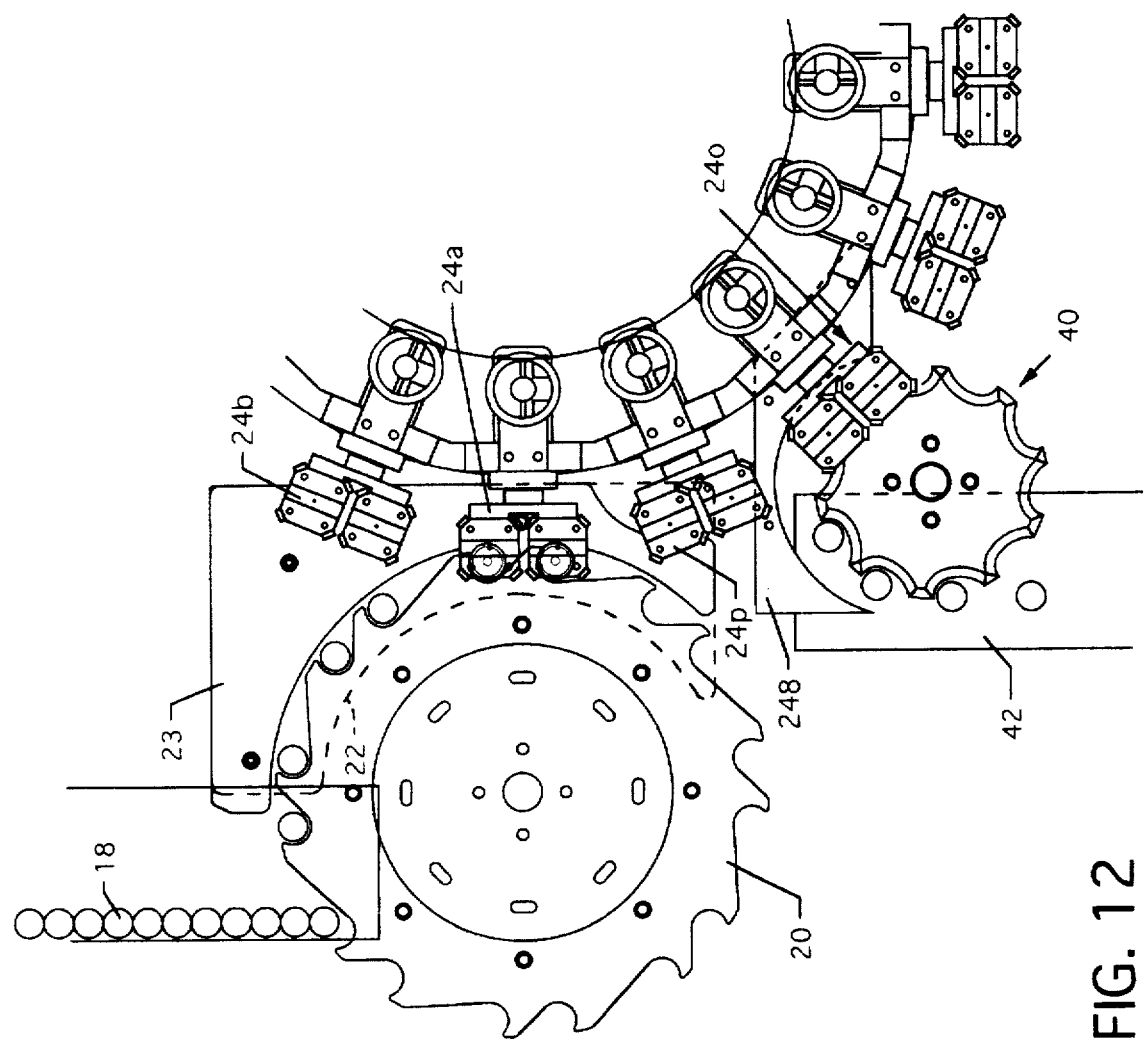
FIG. 12 illustrates the area about the dual rotary cannister test bed and the output star wheel.

FIG. 12 illustrates the area about the output star wheel 40, where all numerals correspond to those elements previously described. A curved guide 248 aligns in close proximity to the output star wheel 40 to assist in guidance and movement of the canisters 18 to the output conveyor 42.

Various modifications can be made to the present invention without departing from the apparent scope hereof.

We claim:

1. A canister tester system for rapid testing of contents of pressurized canisters containing a fluid or gaseous matter comprising:

a. a rotary placement star wheel to transfer said canisters in a vertical position from a conveyor to said canister tester system;

b. an eccentric cam to load said canisters vertically into a plurality rotary canister test beds that rotates horizontally through a plurality of stations;

c. said rotary canister test beds rotate in a vertical plane to mix the contents of said canisters prior to testing;

d. a plunger or plurality of plungers to cause activation of a canister nozzle valve for purging said gaseous matter from said canisters;

e. a plunger or plurality of plungers to cause activation of said canister nozzle valve for testing said fluid or gaseous contents of said canisters;

f. an ejection arm to remove said canisters from said canister test beds; and, g. an output star wheel to deliver said canisters in a vertical position to an output conveyor.

2. The system of claim 1, wherein ball plungers are used to hold said canisters into said canister holders.

3. The system of claim 1, wherein a pin is forcibly depressed into contact with the canister nozzle due to movement of said plunger(s) to cause dispersion of fluid from said canister.

4. The system of claim 1, wherein said plungers are spring loaded plungers with a spring of appropriate tension to activate the canister nozzle.

5. The system of claim 1, wherein an escape platform is activated to provide passage of an unsuitable canister upon activation of said ejection mechanism.

6. The system of claim 1, wherein a central stationary gear provides rotation for said rotary canister test bed.

7. The system of claim 1, wherein said rotary canister test bed comprises two or more canister holders, each capable of holding one canister.

* * * * *